(12) United States Patent
Gill et al.

(10) Patent No.: US 7,702,857 B2
(45) Date of Patent: Apr. 20, 2010

(54) ADJUSTING PARAMETERS USED TO PREFETCH DATA FROM STORAGE INTO CACHE

(75) Inventors: Binny Sher Gill, Auburn, MA (US); Luis Angel Daniel Bathen, Placentia, CA (US); Steven Robert Lowe, Tucson, AZ (US); Thomas Charles Jarvis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 11/843,615

(22) Filed: Aug. 22, 2007

(65) Prior Publication Data

US 2009/0055595 A1 Feb. 26, 2009

(51) Int. Cl.
 *G06F 12/00* (2006.01)
(52) U.S. Cl. ..................................................... 711/137
(58) Field of Classification Search ........................ None
See application file for complete search history.

(56) References Cited

U.S. PATENT DOCUMENTS

| | | | |
|---|---|---|---|
| 5,809,566 A * | 9/1998 | Charney et al. ............ 711/213 |
| 6,105,111 A | 8/2000 | Hammarlund et al. |
| 2003/0004683 A1 * | 1/2003 | Nemawarkar ............... 702/186 |
| 2004/0117556 A1 | 6/2004 | Kadi |
| 2004/0205298 A1 | 10/2004 | Bearden et al. |
| 2004/0268050 A1 | 12/2004 | Cai et al. |
| 2006/0112232 A1 * | 5/2006 | Zohar et al. ................ 711/137 |
| 2006/0265552 A1 | 11/2006 | Davis et al. |
| 2007/0101105 A1 * | 5/2007 | Diefendorff ................ 712/225 |
| 2007/0283101 A1 * | 12/2007 | El-Essawy et al. .......... 711/137 |
| 2008/0177754 A1 * | 7/2008 | Gill et al. .................... 707/10 |
| 2008/0195834 A1 * | 8/2008 | Gill et al. .................... 711/171 |

OTHER PUBLICATIONS

R.L. Oliver, et al., "Dynamic and Adaptive Cache Prefetch Policies", IEEE, 2000, pp. 509-515L.

J. Fritts, "Multi-Level Memory Prefetchig for Media and Stream Processing", IEEE, 2002, pp. 101-105.

I. Hur, et al., "Memory Prefetching Using Adaptive Stream Detection", 39th Annual IEEE/ACM International Symposium on Microarchitecture, 2006, pp. 1-12.

F. Dahlgren, et al., "Sequential Hardware Prefetching in Shared-Memory Multiprocessors", IEEE Transactions on Parallel and Distributed Systems, vol. 6, No. 7, Jul. 1995, pp. 133-746.

(Continued)

*Primary Examiner*—Jack A Lane
(74) *Attorney, Agent, or Firm*—David W. Victor; Konrad Raynes & Victor LLP

(57) ABSTRACT

Provided are a method, system, and article of manufacture for adjusting parameters used to prefetch data from storage into cache. Data units are added from a storage to a cache, wherein requested data from the storage is returned from the cache. A degree of prefetch is processed indicating a number of data units to prefetch into the cache. A trigger distance is processed indicating a prefetched trigger data unit in the cache. The number of data units indicated by the degree of prefetch is prefetched in response to processing the trigger data unit. The degree of prefetch and the trigger distance are adjusted based on a rate at which data units are accessed from the cache.

20 Claims, 6 Drawing Sheets

OTHER PUBLICATIONS

A. Rogers, et al., "Software Support for Speculative Loads", Proceedings of the 5th International Conference on Architectural Support for Programming Languages and Operating System (ASPLOS), vol. 27(9), New York, NY, pp. 38-50, ACM Press, 1992.

K.K.D. Callahan, et al, "Software Prefetching", ACM SIGARCH Computer Architecture News, vol. 19(2), New York, NY, pp. 40-52, ACM Press, 1991.

R.H. Patterson, et al., "Informed Prefetching and Caching", SOSP, pp. 79-95, 1995.

T. Mowry, et al., "Tolerating Latency Through Software-Controlled Prefetching in Shared-Memory Multiprocessors", Journal of Parallel and Distributed Computing, vol. 12, No. 2, pp. 87-106, 1991.

E.H. Gornish, et al., "Compiler-Directed Data Prefetching in Multiprocessors with Memory Hierarchies", Proceedings 1990 International Conference on Supercomputing, ACM SIGARCH Computer Architecture News, vol. 18(3), pp. 354-368, 1990.

T.F. Chen, et al., "Reducing Memory Latency via Non-Blocking and Prefetching Caches", Proceedings of the 5th International Conference on Architectural Support for Programming Languages and Operating System (ASPLOS), vol. 27(9), New York, NY, pp. 51-61, ACM Press, 1992.

C.K. Luk, et al., "Compiler-Based Prefetching for Recursive Data Structures", Architectural Support for Programming Languages and Operating Systems, pp. 222-233, 1996.

A. Roth, et al., Dependence Based Prefetching for Linked Data Structures, ACM SIGPLAN Notices, vol. 33, No. 11, pp. 115-126, 1998.

M.H. Lipasti, et al., "SPAID: Software Prefetching in Pointer- and Call-Intensive Environments", Proceedings of the 28th Annual IEEE/ACM International Symposium of Microarchitecture, pp. 231-236, 1995.

T M Kroeger, et al., "Exploring the Bounds of Web Latency reduction from Caching and Prefetching", USENIX Symposium on Internet Technologies and Systems, 1997.

K.M. Curewitz, et al, "Practical Prefetching via Data Compression", pp. 257-266, 1993.

J. Griffioen et al., "Reducing File System Latency Using a Predictive Approach", USENIX Summer, pp. 197-207, 1994.

D. Kotz, et al., "Practical Prefetching Techniques for Parallel File Systems", Proceedings of the First International Conference on Parallel and Distributed Information Systems, pp. 182-189, IEEE Computer Society Press, 1991.

K.S. Grimsrud, et al., "Multiple Prefetch Adaptive Disk Caching", IEEE Transactions on Knowledge and Data Engineering, vol. 5, No. 1, pp. 88-103, 1993.

S. Harizopoulos, et al., "Hierarchical Caching and Prefetching for High Performance Continuous Media Servers with Smart Disks", IEEE Concurrency, vol. 8, No. 3, pp. 16-22, 2000.

B.S. Gill, et al., "SARC: Sequential Prefetching in Adaptive Replacement Cache", Proceedings of the USENIX 2005 Annual Technical Conference, pp. 293-308, 2005.

A.J. Smith, "Cache Memories", ACM Computing Surveys, vol. 14, No. 3, pp. 473-530, 1982.

F. Dahlgren et al., "Fixed and Adaptive Sequential Prefetching in Shared Memory Multiprocessors", ICPP, pp. 56-63, 1993.

M.K. Tcheun, et al., "An Adaptive Sequential Prefetching Scheme in Shared-Memory Multiprocessors", ICPP, pp. 306-313, 1997.

T. Cortes, et al., "Linear Aggressive Prefetching: A Way to Increase the Performance of Cooperative Caches", Proceedings of the Joint International Parallel Processing Symposium and IEEE Symposium on Parallel and Distributed Processing, San Juan, Puerto Rico, pp. 45-54, 1999.

J.W.C. Fu, et al., "Data Prefetching in Multiprocessor Vector Cache Memories", Proceedings of the 18th annual International Symposium on Computer Architecture, Toronto, Ontario, Canada, pp. 54-63, 1991.

R.L. Lee, et al., "Data Prefetching in Shared Memory Multiprocessors", ICPP, pp. 28-31, 1987 (abstract).

T.F. Chen, et al., "Effective Hardware Based Data Prefetching for High-Performance Processors", IEEE Trans. Computers, vol. 44, No. 5, pp. 609-623, 1995.

F. Dahlgren, et al., "Evaluation of Hardware-Based Stride and Sequential Prefetching in Shared-Memory Multiprocessors", IEEE Transactions on Parallel and Distributed Systems, vol. 7, No. 4, pp. 385-398, 1996.

C. Metcalf, "Data Prefetching: A Cost/Performance Analysis", 1993.

D. Joseph, et al., "Prefetching Using Markov Predictors", IEEE Transactions on Computers, vol. 48, No. 2, pp. 121-133, 1999.

J.S. Vitters, et al., "Optimal Prefetching Via Data Compression", Journal of the ACM, vol. 43, No. 5, pp. 771-793, 1996.

H. Lei, et al., "An Analytical Approach to File Prefetching", 1997 USENIX Annual Technical Conference, Anaheim, CA, 1997.

P. Cao, et al., "A Study of Integrated Prefetching and Caching Strategies", Measurement and Modeling of Computer Systems, pp. 188-197, 1995.

M. Kallahalla, et al., "PC-OPT: Optimal Offline Prefetching and Caching for Parallel I/O Systems", IEEE Trans. Computers, vol. 51, No. 11, pp. 1333-1344, 2002.

T. Kimbrel et al., "Near-Optimal Parallel Prefetching and Caching", IEEE Symposium on Foundations of Computer Science, pp. 540-549, 1996.

T. Kimbrel, et al., "A Trace-Driven Comparison of Algorithms for Parallel Prefetching and Caching", Proceedings of the 1996 Symposium on Operating Systems Design and Implementation, pp. 19-34, USENIX Association, 1996.

P. Reungsang, et al., "Reducing Cache Pollution of Prefetching in a Small Data Cache", ICCD, pp. 530-533, 2001.

P. Jain, et al., "Controlling Cache Pollution in Prefetching with Software-Assisted Cache Replacement", Tech. Rep. CSG-462, M.I.T., 2001.

Storage Performance Council, "SPC Benchmark-1: Specification, Version 1.10.1", Sep. 2006.

B.S. Gill, et al., "WOW: Wide Ordering of Writes-Combining Spatial and Temporal Locality in Non-Volatile Caches", Proceedings of the 4th USENIX Conference on File and Storage Technologies (FAST), pp. 129-142, 2005.

Storage Performance Council, "SPC Benchmark-2: Specification, Version 1.2", Sep. 2006.

* cited by examiner

Data Unit Metadata

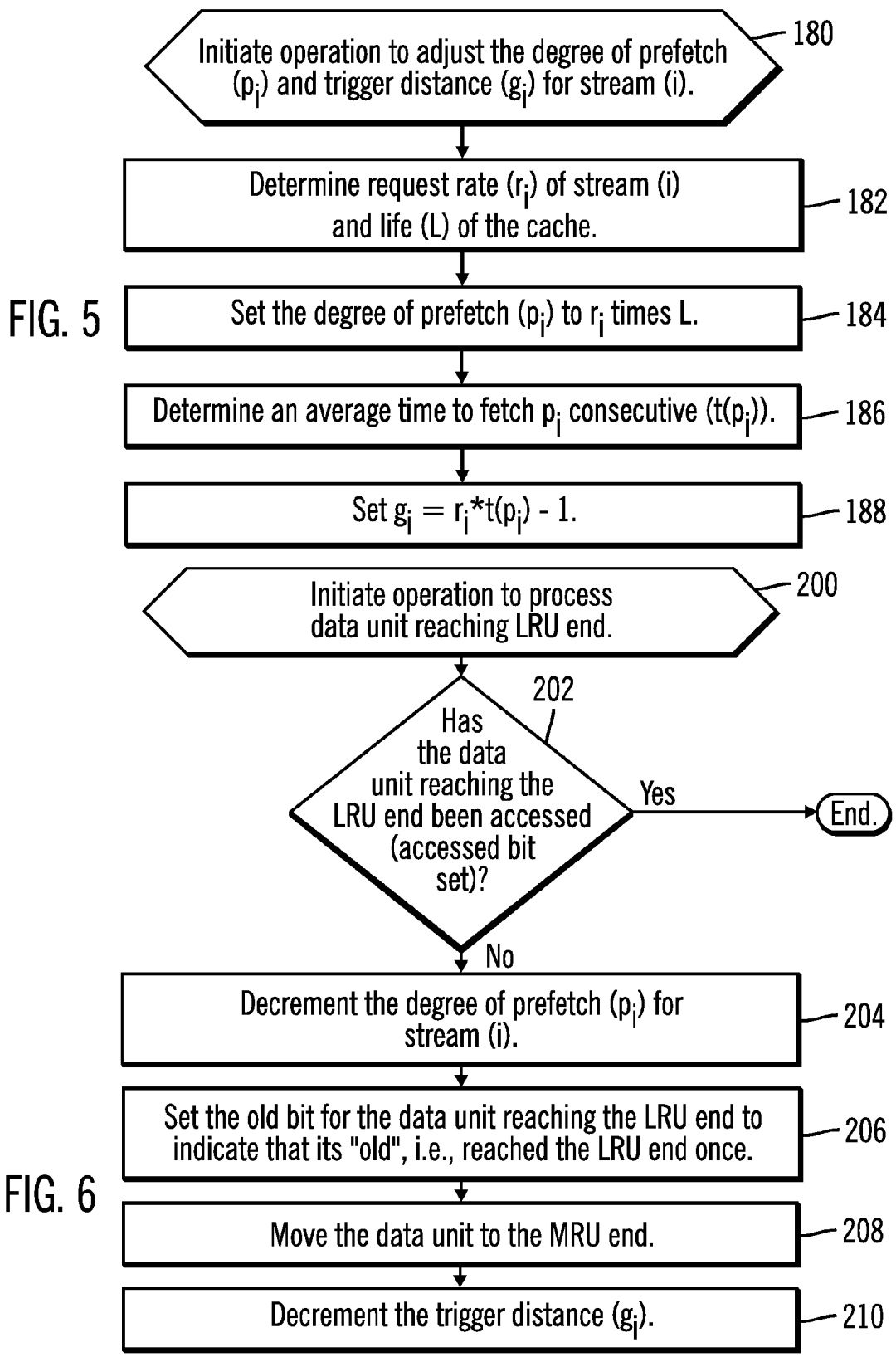

ADJUSTING PARAMETERS USED TO PREFETCH DATA FROM STORAGE INTO CACHE

BACKGROUND OF THE INVENTION

1. Field of the Invention

The present invention relates to a method, system, and article of manufacture for adjusting parameters used to prefetch data from storage into cache.

2. Description of the Related Art

Data prefetching techniques are used to prefetch data from a non-volatile storage device, such as one or more hard disk drives, to a high speed memory, such as a volatile memory device referred to as a cache, in anticipation of future data requests. The data requests may then be serviced from the high speed cache instead of the storage device which takes longer to access. In this way, data may be returned to the requesting device faster.

During a sequential read operation, an application program, such as a batch program, will process numerous data records stored at contiguous locations in the storage device. It is desirable during such sequential read operations to prefetch the sequential data into cache in anticipation of the requests from the application program. A sequential caching algorithm detects when a device is requesting data as part of a sequential access operation. Upon making such a detection, the storage controller or server may begin prefetching sequential data records following the last requested data record into cache in anticipation of future sequential accesses. The cached records may then be returned to the application performing the sequential data operations at speeds substantially faster than retrieving the records from a non-volatile storage device.

One prefetching approach is to perform a sequential readahead. In a One Block Lookahead (OBL) algorithm, one block is prefetched beyond the requested block. OBL can be of three types: (i) always prefetch—prefetch the next block on each reference, (ii) prefetch on miss—prefetch the next block only on a miss, (iii) tagged prefetch—prefetch the next block only if the referenced block is accessed for the first time. A P-Block Lookahead approach extends the idea of OBL by prefetching P blocks instead of one, where P is also referred to as the degree of prefetch. Some approaches dynamically adapt the degree of prefetch based on the workload. Other techniques have suggested a per stream scheme which selects the appropriate degree of prefetch on each miss based on a prefetch degree selector (PDS) table. In a History-based prefetching scheme, a history-based table may be used to predict the next pages to prefetch.

There are two kinds of prefetch requests: (i) synchronous prefetch, and (ii) asynchronous prefetch. A synchronous prefetch is when on a miss on page x, p extra pages are prefetched beyond page x to extend the extent of the client's read request to include more pages. An asynchronous prefetch may occur upon the occurrence of a cache hit on a page x and creates a new read request to prefetch p pages beyond those already in the cache. In each set of the p prefetched pages, a trigger page is identified at a trigger distance of g from the end of the prefetched set of pages. When g=0, the trigger is set on the last page of the prefetched set. When a trigger page is hit, an asynchronous prefetch is requested for the next set of p sequential pages. Unlike synchronous prefetching, asynchronous prefetching enables the cache to pre-store data ahead of sequential read requests for the data. Asynchronous prefetching is used in conjunction with some form of synchronous prefetching to prefetch the initial set of pages.

Sequential prefetching has a high predictive accuracy and focuses prefetching only on the sequential components of workloads. Sequential prefetching techniques include fixed synchronous (FS), adaptive synchronous (AS), and fixed asynchronous (FA). In fixed synchronous (FS) prefetching, a next page or fixed number of next pages is prefetched on a miss. In adaptive synchronous (AS) prefetching, the number of pages prefetched on every miss (p) is gradually increased as the length of the sequence referenced becomes longer. The degree of prefetch (p) starts with a small fixed number (for example, 2) and is either linearly incremented on every miss or exponentially incremented. There may be a predefined upper limit for incrementing p.

In fixed asynchronous (FA) prefetching, the degree of prefetch and trigger distance may be any fixed values.

There is a need in the art for improved techniques for prefetching data.

SUMMARY

Provided are a method, system, and article of manufacture for adjusting parameters used to prefetch data from storage into cache. Data units are added from a storage to a cache, wherein requested data from the storage is returned from the cache. A degree of prefetch is processed indicating a number of data units to prefetch into the cache. A trigger distance is processed indicating a prefetched trigger data unit in the cache. The number of data units indicated by the degree of prefetch is prefetched in response to processing the trigger data unit. The degree of prefetch and the trigger distance are adjusted based on a rate at which data units are accessed from the cache.

BRIEF DESCRIPTION OF THE DRAWINGS

FIG. 5 illustrates an embodiment of operations to adjust prefetch related parameters.

FIGS. 6, 7, and 8 illustrate an alternative embodiment of operations to adjust prefetch related parameters.

DETAILED DESCRIPTION

Figure 1:
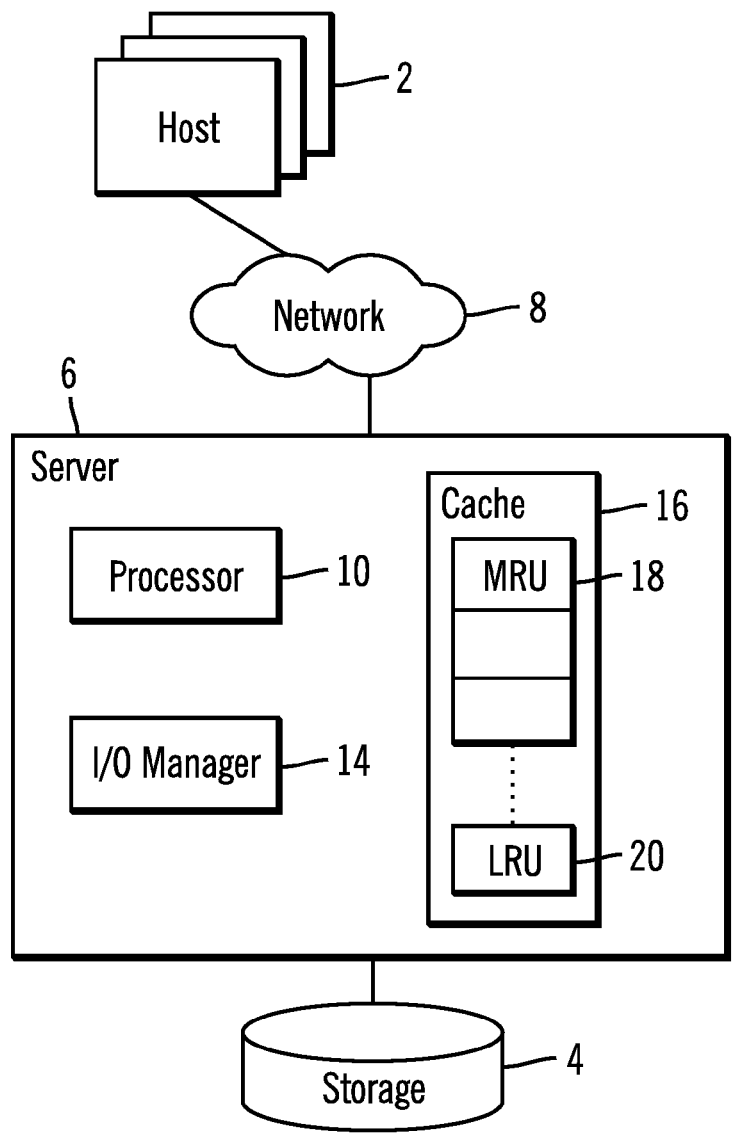
FIG. 1 illustrates an embodiment of a system in which data is prefetched.

FIG. 1 illustrates a computing environment in which aspects of the invention are implemented. One or more hosts 2 communicate Input/Output (I/O) requests to a storage 4 through a server 6. The hosts 2 may communicate with the server 6 via a network 8, such as a Local Area Network (LAN), Storage Area Network (SAN), Wide Area Network (WAN), wireless network, etc. Alternatively, the host 2 may communicate with the server 6 over a bus interface, such as a Peripheral Component Interconnect (PCI) bus. The host 2, storage 4, and server 6 may be housed in separate machines or be included in the same machine connecting via one or more bus interfaces. The server 6 may comprise a suitable storage management system known in the art, such as a storage controller, server, enterprise storage server, etc. The storage 4 may comprise a suitable storage system known in the art, such as a Direct Access Storage Device (DASD), Just a Bunch of Disks (JBOD), a Redundant Array of Independent Disks (RAID), virtualization device, tape storage, optical disk storage, or any other storage system known in the art. The host 2 may comprise any suitable computing device known in the art, such as a workstation, desktop computer, server, mainframe, handheld computer, telephony device, etc. The hosts 2 include application programs that generate I/O requests.

The server 6 includes a processor 10 and a cache 16. The cache 16 may be comprised of one or more volatile memory devices. The server 6 stages data units into the cache 16 retrieved from the storage 4 in anticipation of subsequent requests for the data. A "data unit" comprises any known accessible unit of data known in the art, such as a byte at a Logical Block Address (LBA), a track, a fraction of a byte, a page, etc. The 15 server 6 includes an I/O manager 14 comprising the code to process I/O requests from the hosts 2 and prefetch data.

The cache 16 stores data units fetched from the storage 4 in a queue 16 having a most recently used (MRU) end 18 and a least recently used (LRU) end 20. A reference to a data unit added to cache 16 is added to the MRU end 18. A data unit removed or demoted from the cache 16 is removed from the LRU end 20. When removing an entry from the LRU end 20, the LRU end 20 pointer is modified to point to a data unit immediately preceding the data unit removed from the cache 16.

One or more of the hosts 2 may initiate streams of read requests, where each stream independently sequentially accesses data in the storage 4. The cache 16 may include data for the multiple sequential accesses. In one embodiment, there is one LRU queue ordering the data units from all the streams staged into the cache 16. In an alternative embodiment, each stream may use a separate LRU queue in the cache 16.

Figure 2:
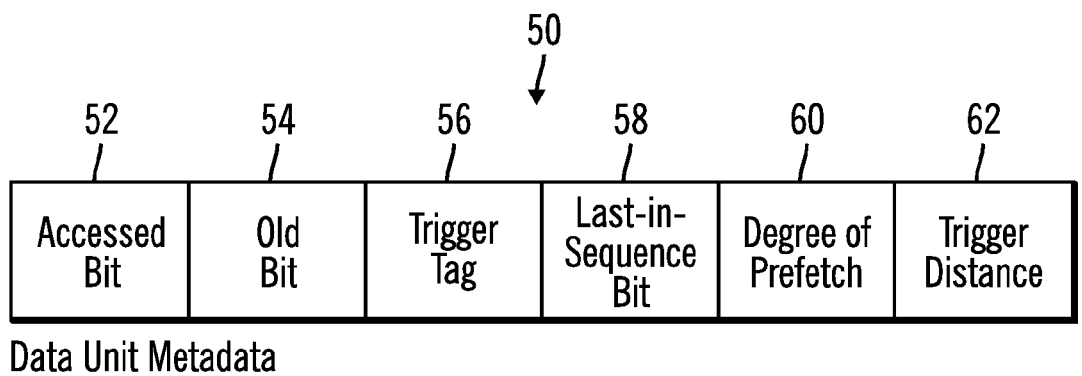
FIG. 2 illustrates an embodiment of metadata maintained for a data unit prefetched into the cache.

FIG. 2 illustrates an embodiment of data unit metadata 50, including: an accessed bit 52 indicating whether the data unit was accessed or returned in response to a read request from the cache 16; an old bit 54 indicating whether the data unit previously reached the LRU end 20 and was moved to the MRU end 18; a trigger tag 56 indicating whether the data unit is the trigger data unit whose access causes the prefetching of further sequential data units; a last-in-sequence bit 58 indicating whether the data unit is the last in a prefetch group of sequential data units prefetched into cache for one stream accessing sequential data units; a degree of prefetch 60 indicating a number of sequential data units to prefetch from the storage 4 to the cache 16 following a last data unit in the cache 16 for the stream; and a trigger distance 62 indicating a number of data units prior to the last data unit in the sequence, where the data unit that is located the number of data units prior to the last data unit comprises a trigger data unit (having the trigger tag 46 set) whose access causes the prefetching of the number of sequential data units indicated in the degree of prefetch.

In one embodiment, a degree of prefetch 60 and trigger distance 62 are maintained for each separate stream independently accessing sequential data units in the cache 16. In one embodiment, the degree of prefetch 60 and the trigger distance 62 for one stream is stored in the metadata for the last prefetched data unit in the sequence of data units for the stream stored in the cache 16.

Figure 3:
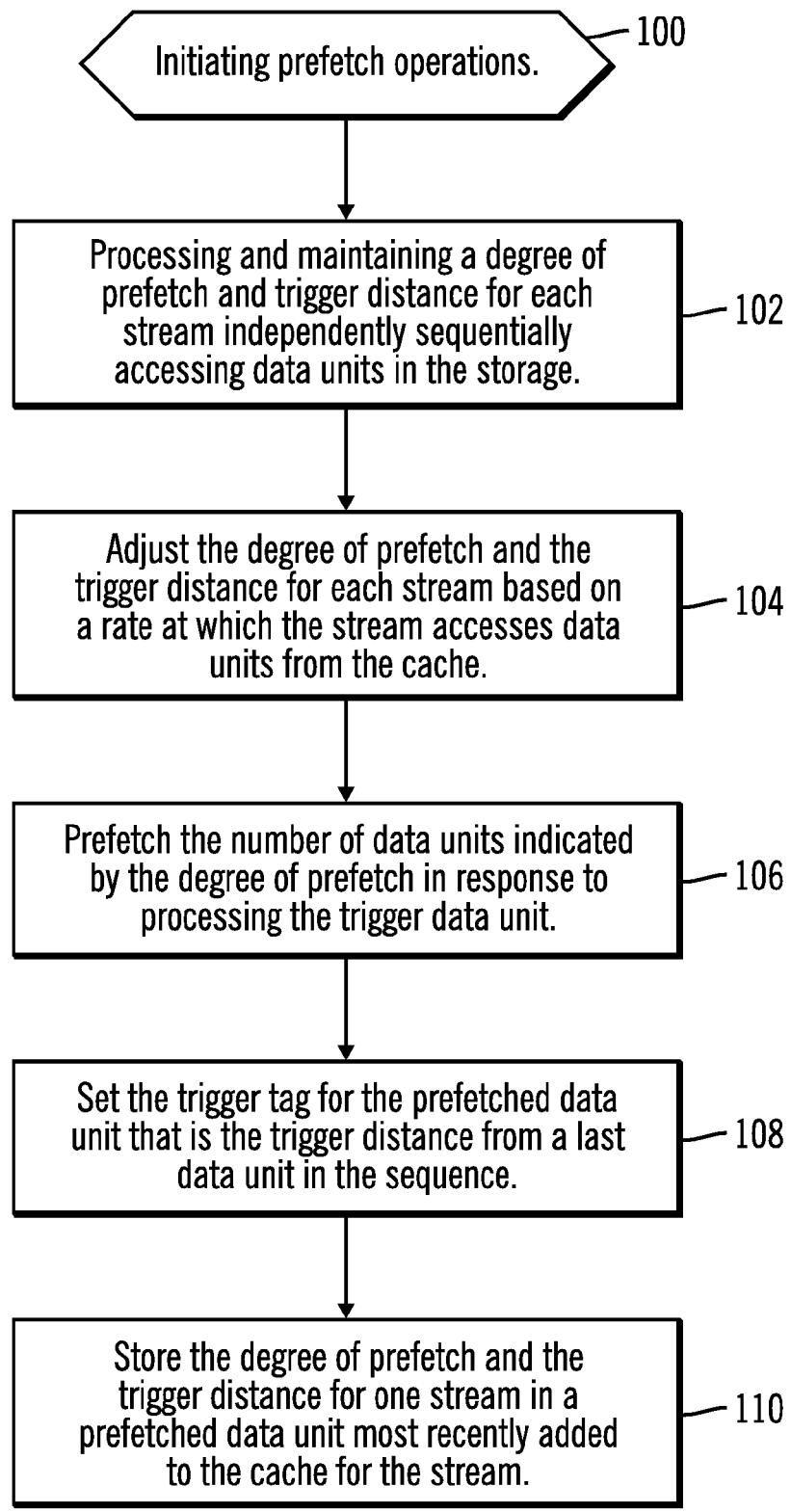
FIG. 3 illustrates an embodiment of prefetch related operations.

FIG. 3 illustrates an embodiment of operations performed by the I/O manager 14 to prefetch data in anticipation of sequential reads from multiple independent streams of access requests. Upon initiating (at block 100) prefetch operations, the I/O manager 14 processes and maintains (at block 102) a degree of prefetch 60 and trigger distance 62 for each stream independently sequentially accessing data units in the storage 4. The degree of prefetch 60 and trigger distance 62 for each stream of sequential accesses may be stored in the last data unit prefetched for the stream in the cache 16, which may comprise the data unit whose last-in-sequence bit 58 is set. The I/O manager 14 adjusts (at block 104) the degree of prefetch 60 and the trigger distance 62 for each stream based on a rate at which the stream accesses data units from the cache 16.

The I/O manager 14 prefetches (at block 106) the number of data units indicated by the degree of prefetch 60 for the stream sequentially following the data unit that is the last sequential data unit in the cache for the stream (has the last-in-sequence bit 58 set) in response to processing the trigger data unit, i.e., the data unit whose trigger tag 56 is set. The trigger tag 56 for the recently prefetched data unit (prefetched at block 106) that is the trigger distance from a last prefetched data unit in the sequence is set (at block 108). The last-in-sequence bit 58 would be set for the last prefetched data unit in the sequence. The degree of prefetch 60 and the trigger distance 62 for one stream is stored (at block 110) in the prefetched data unit most recently added to the cache for the stream when adding prefetched data units to the cache 16.

Figure 4:
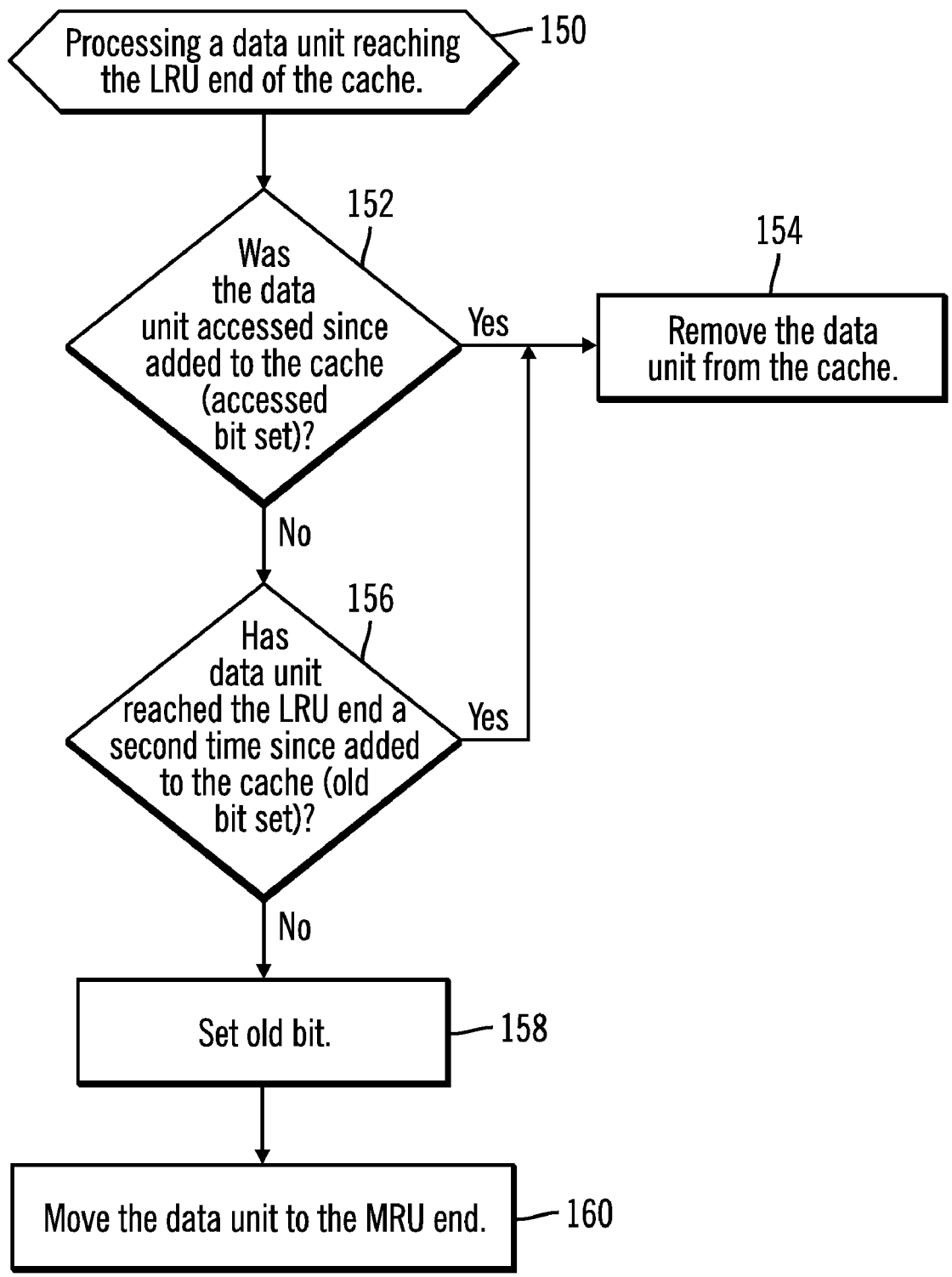
FIG. 4 illustrates an embodiment of operations to process a data unit reaching a Least Recently Used (LRU) end of the cache.

FIG. 4 illustrates an embodiment of operations performed by the I/O manager 14 in response to a data unit in the cache 16 reaching the LRU end 20. A data unit may reach the LRU end 20 when the current data unit at the LRU end 20 is destaged or demoted from the cache 16 and the LRU end 20 is set to point to the data unit immediately preceding the data unit removed from the cache 16. Upon processing (at block 150) a data unit reaching the LRU end 20, if (at block 152) the data unit reaching the LRU end 20 was accessed since being added to the cache 16, which can be determined by the accessed bit 52 being set, then the accessed data unit remains at the LRU end 20 until being removed (at block 154) from the cache 16.

If (at block 152) the data unit has not been accessed (the accessed bit 52 for the data unit is not set), then the I/O manager 14 determines (at block 156) whether the data unit reached the LRU end 20 a second time since added to the cache 16 (the old bit 54 for the data unit is set). If (at block 156) the data unit has reached the LRU end 20 a second time, which may be indicated by the old bit 54 being set, then control proceeds to leave the data unit at the LRU end 20 to be available for removal (at block 154). If (at block 156) the data unit has not previously reached the LRU end 20 since being added to cache, which may be indicated by the old bit 54 not being set, then the I/O manager 14 sets (at block 158) the old bit 54 for the data unit and moves (at block 160) the data unit from the LRU end 20 to the MRU end 18 to let the unaccessed data unit continue to remain in cache longer to provide the stream sequentially accessing the data additional time to access the data unit. However, if the data unit is not accessed after being moved to the MRU end 18, then it may be removed from cache, which may occur if the stream has stopped sequentially accessing data units.

FIG. 5 illustrates an embodiment of operations performed by the I/O manager 14 to adjust the degree of prefetch 60 and trigger distance 62 for a stream of sequential accesses. Upon initiating (at block 180) an operation to adjust the degree of prefetch ($p_i$) and trigger distance ($g_i$) for stream (i), the I/O manager 14 determines (at block 182) a request rate ($r_i$) of stream (i) and life (L) of the cache. The request rate ($r_i$) may comprise the pages per second accessed by the stream (i) and the life (L) may comprise the time during which an entry remains in the cache 16, which can be determined by subtracting the MRU end 18 timestamp by the LRU end 20 timestamp. The I/O manager 14 may set (at block 184) the degree of prefetch ($p_i$) to $r_i$ times L.

To adjust the trigger distance ($g_i$) for the stream (i), the I/O manager 14 determines (at block 186) an average time for stream (i) to fetch $p_i$ consecutive ($t(p_i)$) data units from the cache 16. The I/O manager 14 may then set (at block 188) the trigger distance ($g_i$) to the request rate ($r_i$) times the average time to prefetch a number of data units comprising the degree of prefetch ($t(p_i)$) minus one.

With the described embodiment of FIG. 5, as the stream requests data at a faster rate, i.e., consumes data units in cache 16 at a faster rate, then the degree of prefetch and the trigger distance are increased to prefetch more data units at a faster rate to accommodate the faster access rate of the stream.

Figure 7:
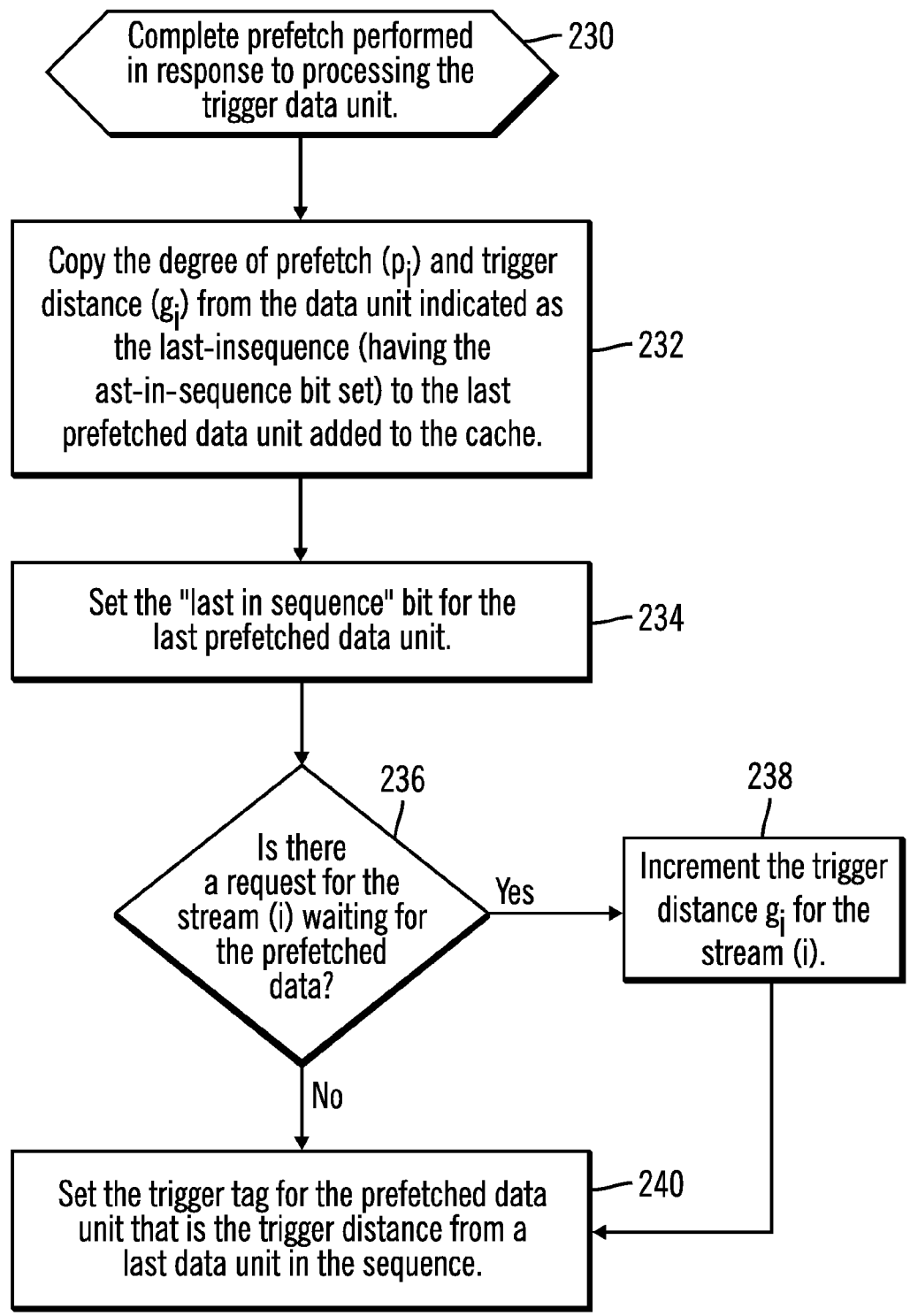
Figure 8:
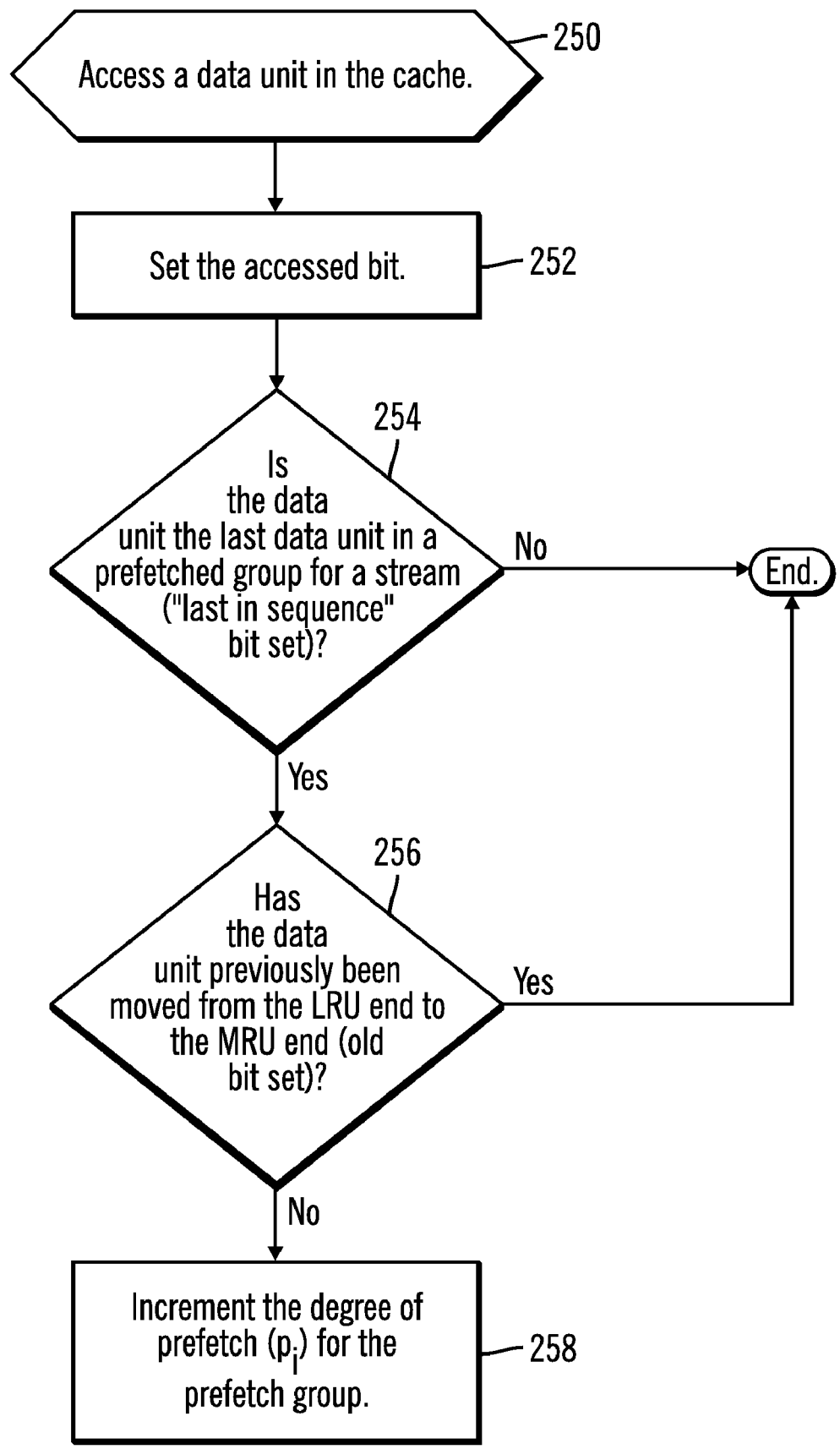

FIGS. 6, 7, and 8 illustrate an alternative embodiment for adjusting the degree of prefetch and trigger distance for a stream. Initially, the degree of prefetch may be set to a default value and the trigger distance maybe be set to zero (or some other value) to cause prefetching upon reaching the last prefetched data unit in the cache for a stream. Adjustments may increase the trigger distance and degree of prefetch to cause prefetching upon accessing a data unit preceding the last data unit in the sequence by the trigger distance.

FIG. 6 illustrates an embodiment of operations to adjust the degree of prefetch ($p_i$) and trigger distance ($g_i$) for a stream when processing a data unit reaching the LRU end 20. With respect to FIG. 6, upon processing a data unit reaching (at block 200) the LRU end 20, which may occur when the LRU end 20 pointer is adjusted to point to a new data unit, the I/O manager 14 determines (at block 202) whether the data unit reaching the LRU end 20 has been accessed (accessed bit 52 is set). If the data unit has been accessed, then control ends, such that the data unit will be demoted from cache during the next operation to remove one data unit from the cache 16. If (at block 202) the data unit reaching the LRU end 20 has not been accessed (the accessed bit 52 is not set), then the I/O manager 14 decrements (at block 204) the degree of prefetch ($p_i$) for stream (i) for which the data unit was prefetched. The I/O manager 14 sets (at block 206) the old bit 54 for the data unit reaching the LRU end 20 to indicate that its "old", i.e., reached the LRU end once. The data unit is then moved (at block 208) to the MRU end 18 to provide the stream further time to access the unaccessed prefetched data unit. The trigger distance ($g_i$) for stream (i) may further be decremented (at block 210) to further slow the rate of prefetching by causing prefetching later in the sequential data units. The degree of prefetch and trigger distance for the stream may be decremented to accommodate the stream's lower rate of access to avoid data units for the stream reaching the LRU end 20 unaccessed.

FIG. 7 illustrates an embodiment of operations performed by the I/O manager 14 to perform prefetch management operations and adjust the prefetch distance ($g_i$) when completing a prefetch operation for a stream (i). Upon completing (at block 230) a prefetch performed in response to processing the trigger data unit, the I/O manager 14 copies (at block 232) the degree of prefetch ($p_i$) and trigger distance ($g_i$) from the data unit indicated as the last-in-sequence (having the last-in-sequence bit 58 set), which is the last data unit in the cache 16 from which the data was prefetched, to the last prefetched data unit added to the cache 16. The "last-in-sequence" bit 58 for the last prefetched data unit added to the cache 16 is set (at block 234).

If (at block 236) there is a request for the stream (i) waiting for the prefetched data, which means the last-in-sequence data unit was accessed while waiting for the prefetch to complete, then the I/O manager 14 increments (at block 238) the trigger distance $g_i$ for the stream (i). From the no branch of block 236 or from block 238, the I/O manager 14 sets (at block 240) the trigger tag 56 for the prefetched data unit that is the trigger distance ($g_i$) from a last prefetched data unit in the sequence.

FIG. 8 illustrates an embodiment of operations performed by the I/O manager 14 to adjust the degree of prefetch ($p_i$) for a stream (i) when the stream (i) accesses a sequential data unit prefetched into the cache 16. Upon accessing (at block 250) a data unit in the cache 16, the I/O manager 14 sets (at block 252) the accessed bit 52 for the accessed data unit. If (at block 254) the accessed data unit is the last data unit in a prefetch group for the stream, i.e., group of sequential items prefetched in a prefetch operation for the stream, ("last-in-sequence" bit 58 set) and if (at block 256) the accessed data unit was not previously moved from the LRU end 20 to the MRU end 18 (the old bit 54 is not set), then the degree of prefetch ($p_i$) for the stream (i) or prefetch group is incremented (at block 258). This results in the degree of prefetch ($p_i$) being steadily incremented. When the degree of prefetch ($p_i$) reaches a large enough size that some unaccessed pages start reaching the MRU end 18 of the cache, the associated decrease in degree of prefetch ($p_i$) balances out this steady increase in the degree of prefetch ($p_i$), and a steady value of degree of prefetch ($p_i$) is adaptively discovered.

If (at block 254) the accessed data unit is not the last in the sequence of prefetched data units or if (at block 256) the last data unit in the sequence was accessed but was previously moved back to the MRU end 18 after reaching the LRU end 20 unaccessed, then control ends without increasing the degree of prefetch.

With described embodiments, a degree of prefetch and trigger distance are adjusted based on the rate of a stream accessing sequential data units in the cache. If the stream is accessing sequential data units at a higher rate so that the prefetching is not keeping data units in cache for the access request, then number of data units prefetched or frequency of prefetching are increased to prefetch data at a higher rater to accommodate the higher access rate. Further, if the stream slows its rate of access so that data units are reaching the LRU end without being accessed, then the number of data units prefetched or frequency of prefetching are decreased to avoid over prefetching data units.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In the described embodiments, there is one cache queue 16 for multiple streams. In an alternative embodiment, there may be a separate LRU cache for each data stream.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3, 4, 5, 6, 7, and 8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture including code to communicate with a storage and a cache in a computer readable memory and cause operations, the operations comprising:
adding data units from the storage to the cache, wherein requested data from the storage is returned from the cache;
processing a degree of prefetch indicating a number of data units to prefetch into the cache;
processing a trigger distance indicating a prefetched trigger data unit in the cache;
prefetching the number of data units indicated by the degree of prefetch in response to processing the trigger data unit;
adjusting the degree of prefetch and the trigger distance based on a rate at which data units are accessed from the cache; and
maintaining one degree of prefetch and trigger distance values for each stream independently sequentially accessing data units in the storage, wherein the prefetched data units comprise sequential data units, and wherein different streams are capable of having different degree and trigger distance values based on the rate at which sequential data units are accessed by the stream.

2. The article of manufacture of claim 1, wherein the degree of prefetch is calculated as a function of a request rate of the data units in the cache and a time data units remain in the cache.

3. The article of manufacture of claim 2, wherein the trigger distance is calculated as a function of the request rate and an average time to fetch the degree of prefetch number of sequential data units.

4. The article of manufacture of claim 1, wherein the cache has a most recently used (MRU) end and a least recently used (LRU) end, wherein prefetched data is added to the MRU end, wherein the operations further comprise:
decrementing the degree of prefetch in response to determining that an unaccessed data unit reached the LRU end.

5. The article of manufacture of claim 1, wherein the cache has a most recently used (MRU) end and a least recently used (LRU) end, wherein prefetched data is added to the MRU end, wherein the operations further comprise:
   moving an unaccessed data unit reaching the LRU end to the MRU end in response to the unaccessed data unit reaching the LRU end for a first time since added to the cache;
   removing the unaccessed data unit reaching the LRU end from the cache in response to the unaccessed data unit reaching the LRU end an additional time since added to the cache; and
   removing an accessed data unit in response to the accessed data unit at the LRU end of the cache being demoted from the cache.

6. The article of manufacture of claim 1, wherein the cache has a most recently used (MRU) end and a least recently used (LRU) end, wherein prefetched data is added to the MRU end, wherein data units added to the cache are prefetched in prefetch groups comprising sequential data units in the storage, wherein the operations further comprise:
   incrementing the degree of prefetch in response to accessing a last data unit in the prefetch group that has not previously reached the LRU end since added to the cache.

7. The article of manufacture of claim 1, wherein the cache has a most recently used (MRU) end and a least recently used (LRU) end, wherein prefetched data is added to the MRU end, wherein the operations further comprise:
   decrementing the degree of prefetch in response to processing one data unit at the LRU end satisfying a condition; and
   decrementing the trigger distance in response to decrementing the degree of prefetch.

8. The article of manufacture of claim 1, wherein the operations further comprise:
   incrementing the trigger distance in response to completing adding prefetched data units to the cache when there is a request to a data unit in the storage that is not in the cache.

9. The article of manufacture of claim 1, wherein the operations further comprise:
   setting a tag in metadata for the trigger data unit indicating that the data unit is the trigger data unit, wherein the number of data units indicated by the degree of prefetch is prefetched in response to processing the data unit having the tag in the metadata set.

10. The article of manufacture of claim 1, wherein the operations further comprise:
   storing the degree of prefetch and the trigger distance in a prefetched data unit most recently added to the cache.

11. A system in communication with a storage, comprising:
   a processor;
   a cache;
   a computer readable storage medium including code executed by the processor to perform operations, the operations comprising:
      adding data units from the storage to the cache, wherein requested data from the storage is returned from the cache;
      processing a degree of prefetch indicating a number of data units to prefetch into the cache;
      processing a trigger distance indicating a prefetched trigger data unit in the cache;
      prefetching the number of data units indicated by the degree of prefetch in response to processing the trigger data unit;
      adjusting the degree of prefetch and the trigger distance based on a rate at which data units are accessed from the cache; and
      maintaining one degree of prefetch and trigger distance values for each stream independently sequentially accessing data units in the storage, wherein the prefetched data units comprise sequential data units, and wherein different streams are capable of having different degree and trigger distance values based on the rate at which sequential data units are accessed by the stream.

12. The system of claim 11, wherein the degree of prefetch is calculated as a function of a request rate of the data units in the cache and a time data units remain in the cache.

13. The system of claim 11, wherein the cache has a most recently used (MRU) end and a least recently used (LRU) end, wherein prefetched data is added to the MRU end, and wherein the operations further comprise:
   decrementing the degree of prefetch in response to determining that an unaccessed data unit reached the LRU end.

14. The system of claim 11, wherein the cache has a most recently used (MRU) end and a least recently used (LRU) end, wherein prefetched data is added to the MRU end, and wherein the operations further comprise:
   moving an unaccessed data unit reaching the LRU end to the MRU end in response to the unaccessed data unit reaching the LRU end for a first time since added to the cache;
   removing the unaccessed data unit reaching the LRU end from the cache in response to the unaccessed data unit reaching the LRU end an additional time since added to the cache; and
   removing an accessed data unit in response to the accessed data unit at the LRU end of the cache being demoted from the cache.

15. The system of claim 11, wherein the cache has a most recently used (MRU) end and a least recently used (LRU) end, wherein prefetched data is added to the MRU end, and wherein the operations further comprise:
   decrementing the degree of prefetch in response to processing one data unit at the LRU end satisfying a condition; and
   decrementing the trigger distance in response to decrementing the degree of prefetch.

16. A method, comprising:
   adding data units from a storage to a cache, wherein requested data from the storage is returned from the cache;
   processing a degree of prefetch indicating a number of data units to prefetch into the cache;
   processing a trigger distance indicating a prefetched trigger data unit in the cache;
   prefetching the number of data units indicated by the degree of prefetch in response to processing the trigger data unit;
   adjusting the degree of prefetch and the trigger distance based on a rate at which data units are accessed from the cache; and
   maintaining one degree of prefetch and trigger distance values for each stream independently sequentially accessing data units in the storage, wherein the prefetched data units comprise sequential data units, and wherein different streams are capable of having different degree and trigger distance values based on the rate at which sequential data units are accessed by the stream.

17. The method of claim 16, wherein the degree of prefetch is calculated as a function of a request rate of the data units in the cache and a time data units remain in the cache.

18. The method of claim 16, wherein the cache has a most recently used (MRU) end and a least recently used (LRU) end, wherein prefetched data is added to the MRU end, further comprising:
  decrementing the degree of prefetch in response to determining that an unaccessed data unit reached the LRU end.

19. The method of claim 16, wherein the cache has a most recently used (MRU) end and a least recently used (LRU) end, wherein prefetched data is added to the MRU end, further comprising:
  moving an unaccessed data unit reaching the LRU end to the MRU end in response to the unaccessed data unit reaching the LRU end for a first time since added to the cache;
  removing the unaccessed data unit reaching the LRU end from the cache in response to the unaccessed data unit reaching the LRU end an additional time since added to the cache; and
  removing an accessed data unit in response to the accessed data unit at the LRU end of the cache being demoted from the cache.

20. The method of claim 16, wherein the cache has a most recently used (MRU) end and a least recently used (LRU) end, wherein prefetched data is added to the MRU end, further comprising:
  decrementing the degree of prefetch in response to processing one data unit at the LRU end satisfying a condition; and
  decrementing the trigger distance in response to decrementing the degree of prefetch.

* * * * *